(12) United States Patent
Song et al.

(10) Patent No.: US 8,888,354 B2
(45) Date of Patent: Nov. 18, 2014

(54) BACKLIGHT ASSEMBLY WITH UNIFORM LIGHT DISTRIBUTION

(75) Inventors: Min-Young Song, Asan-si (KR); Jae-Joong Kwon, Suwon-si (KR); Seul-Gi Kim, Seoul (KR); Hyun-Chul Bae, Suwon-si (KR); Si-Joon Song, Suwon-si (KR); Sang-Chul Byun, Anyang-si (KR); Dong-Hyeon Lee, Seoul (KR)

(73) Assignee: Samsung Display Co., Ltd., Yongin, Gyeonggi-Do (KR)

(*) Notice: Subject to any disclaimer, the term of this patent is extended or adjusted under 35 U.S.C. 154(b) by 218 days.

(21) Appl. No.: 13/493,704

(22) Filed: Jun. 11, 2012

(65) Prior Publication Data
US 2013/0039093 A1    Feb. 14, 2013

(30) Foreign Application Priority Data

Aug. 12, 2011    (KR) .................. 10-2011-0080821

(51) Int. Cl.
*F21V 8/00*    (2006.01)

(52) U.S. Cl.
CPC .............. *G02B 6/002* (2013.01); *G02B 6/0053* (2013.01); *G02B 6/0036* (2013.01); *G02B 6/0068* (2013.01)
USPC ........................................................ 362/613

(58) Field of Classification Search
CPC .... G02B 6/0045; G02B 6/0046; G02B 6/002; G02B 6/0068; G02B 6/0073
See application file for complete search history.

(56) References Cited

U.S. PATENT DOCUMENTS

| | | | | |
|---|---|---|---|---|
| 6,913,366 B2 * | 7/2005 | Lee | ................ | 362/628 |
| 7,461,962 B2 * | 12/2008 | Lee et al. | ................ | 362/613 |
| 7,766,528 B2 * | 8/2010 | Epstein et al. | ................ | 362/609 |
| 8,342,729 B2 * | 1/2013 | Chang | ................ | 362/609 |
| 2008/0123350 A1 * | 5/2008 | Choe et al. | ................ | 362/331 |
| 2008/0316767 A1 * | 12/2008 | Woo et al. | ................ | 362/612 |
| 2010/0165662 A1 | 7/2010 | Hamada | | |
| 2010/0290246 A1 * | 11/2010 | Kim et al. | ................ | 362/602 |

FOREIGN PATENT DOCUMENTS

| | | |
|---|---|---|
| JP | 2003-281917 | 10/2003 |
| JP | 2004-177890 | 6/2004 |
| JP | 2009-117272 | 5/2009 |
| JP | 2009-123489 | 6/2009 |
| KR | 10-2003-0018789 | 3/2003 |
| KR | 10-2005-0064168 | 6/2005 |

(Continued)

OTHER PUBLICATIONS

English Abstract for Publication No. 10-2003-0018789.
English Abstract for Publication No. 10-0783592.
English Abstract for Publication No. 2009-123489.
English Abstract for Publication No. 2009-117272.
Engush Abstract for Publication No. 2003-281917.
English Abstract for Publication No. 10-2010-0122539.

(Continued)

*Primary Examiner* — Bao Q Truong
(74) *Attorney, Agent, or Firm* — F. Chau & Associates, LLC (57) ABSTRACT

A backlight assembly includes a light guide plate having at least five sides. There is a first side. A second side is parallel to and equal in length to the first side. A third side is perpendicular to the first and second sides. A fourth side is parallel to and shorter in length than the third side. There is at least one oblique side connecting the fourth side to the first or second side. The backlight assembly additionally includes a light source unit disposed the fourth side and the oblique side of the light guide plate.

19 Claims, 11 Drawing Sheets

(56) References Cited

FOREIGN PATENT DOCUMENTS

| | | |
|---|---|---|
| KR | 10-0783592 | 12/2007 |
| KR | 10-2008-0111590 | 12/2008 |
| KR | 10-2009-0053629 | 5/2009 |
| KR | 10-2010-0122539 | 11/2010 |

OTHER PUBLICATIONS

English Abstract for Publication No. 10-2009-0053629.
English Abstract for Publication No. 10-2008-0111590.
English Abstract for Publication No. 10-2005-0064168.
English Abstract for Publication No. 2004-177890.

\* cited by examiner

BACKLIGHT ASSEMBLY WITH UNIFORM LIGHT DISTRIBUTION

CROSS-REFERENCE TO RELATED APPLICATION

This application claims priority to and the benefit of Korean Patent Application No. 10-2011-0080821 filed in the Korean Intellectual Property Office on Aug. 12, 2011, the entire contents of which are incorporated herein by reference.

BACKGROUND (a) Technical Field

The present invention relates to a backlight assembly, and more particularly, to a backlight assembly in which light can be uniformly distributed.

(b) Discussion of the Related Art

A display device is an element of a computer monitor, a television, a mobile phone, etc. which is capable of displaying an image. Display devices are widely used today. There are many different types of display devices, such as, a cathode ray tube (CRT) display device, a liquid crystal display (LCD), a plasma display device, and the like.

A liquid crystal display panel, which is one of the more common types of flat panel displays currently in use, includes two display panels with field generating electrodes such as a pixel electrode and a common electrode and a liquid crystal layer interposed therebetween. The liquid crystal display generates an electric field in the liquid crystal layer by applying a voltage to the field generating electrodes. The generated electric filed determines the alignment of liquid crystal molecules of the liquid crystal layer and accordingly controls polarization of incident light, thereby displaying images.

Since the liquid crystal display does not self-emit light, the liquid crystal display needs a light source. The light source may either be an artificial light source or a natural light source. Where an artificial light source is used, a light guide plate (LOP) is used to distribute the generated light to provide a uniform luminance over the entire display panel.

The artificial light source used in the liquid crystal display may be a light emitting diode (LED), a cold cathode fluorescent lamp (CCFL), an external electrode fluorescent lamp (EDI), or the like.

SUMMARY OF THE INVENTION

Exemplary embodiments of the present invention provide a backlight assembly in which a predetermined portion is prevented from being brighter than other portions and/or light is effectively distributed to all portions of the backlight assembly.

Exemplary embodiments of the present invention provide a backlight assembly that entirely and uniformly distributes light to a display panel such as an LCD.

An exemplary embodiment of the present invention provides a backlight assembly including a light guide plate including a cutting part where at least one corner is cut in an oblique direction with respect to one side; and a light source unit disposed facing the one side of the light guide plate and the cutting part.

The light source unit may include at least one first light emitting member disposed facing a point adjacent to the cutting part of the one side of the light guide plate and at least one second light emitting member disposed facing the cutting part of the light guide plate.

The cutting part of the light guide plate may be formed at two corners which are disposed at opposite ends of the one side.

The light guide plate may have a rectangular shape including a short side and a long side and the one side may be the short side.

The number of second light emitting members may account for at least 10% of the total number of the first and second light emitting members.

An angle between an emission surface of the first light emitting member and an emission surface of the second light emitting member may be 100 degrees or more and/or 150 degrees or less.

An angle between the one side and the cutting part may be 100 degrees or more and/or 150 degrees or less.

The light source unit may further include a printed circuit board having an at least once-curved shape where the first light emitting member and the second light emitting member are attached.

A curved angle of the printed circuit board may be 100 degrees or more and/or 150 degrees or less.

The backlight assembly may further include a first prism sheet disposed on the light guide plate and a second prism sheet disposed on the first prism sheet.

The first prism sheet may include a plurality of first prism patterns aligned with each other in a first direction and the second prism sheet may include a plurality of second prism patterns aligned with each other in a second direction perpendicular to the first direction.

The backlight assembly may further include a first diffuser sheet disposed between the light guide plate and the first prism sheet.

The backlight assembly may further include a second diffuser sheet disposed on the second prism sheet.

The backlight assembly may further include a prism sheet disposed on the light guide plate. The light guide plate includes an upper surface and a lower surface. The prism sheet may include a plurality of first prism patterns aligned with each other in a first direction on the upper surface; and a plurality of second prism patterns aligned with each other in a second direction perpendicular to the first direction on the lower surface.

The light guide plate may further include a plurality of collecting patterns having dotted shapes of different sizes.

The collecting patterns may be formed larger at a place where the light from the light source unit would otherwise not reach with sufficient brightness.

The collecting patterns may be formed in a direction parallel to the one side of the light guide plate. The collecting patterns formed closest to the one side may be larger than those collecting patterns formed farther from the one side. Moreover, the collecting patterns formed farther away from the light source unit may be formed larger than those collecting patterns formed closer to the light source unit.

According to exemplary embodiments of the present invention, the first light emitting member is disposed at one side. The second light emitting member is disposed at a corner which is disposed at an end of the one side. The second light emitting member is disposed with a predetermined angle between the second light emitting member and the first light emitting member. The light provided from the light source unit can be uniformly emitted to the outside.

Further, since both a prism sheet having horizontal prism patterns and a prism sheet having vertical prism patterns are applied to the backlight assembly, the light provided from the light source unit can be uniformly emitted over the entire area of the display panel.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF TIRE EMBODIMENTS

Exemplary embodiments of the present invention will be described more fully hereinafter with reference to the accompanying drawings. The described embodiments may be modified in various different ways without departing from the spirit or scope of the present invention.

In the drawings, the thickness of layers, films, panels, regions, etc., may be exaggerated for clarity. Like reference numerals may designate like elements throughout the specification. It will be understood that when an element such as a layer, film, region, or substrate is referred to as being "on" another element, it can be directly on the other element or intervening elements may also be present.

First, a liquid crystal display including a backlight assembly according to an exemplary embodiment of the present invention will be described with reference to the accompanying drawings as follows.

Figure 1:
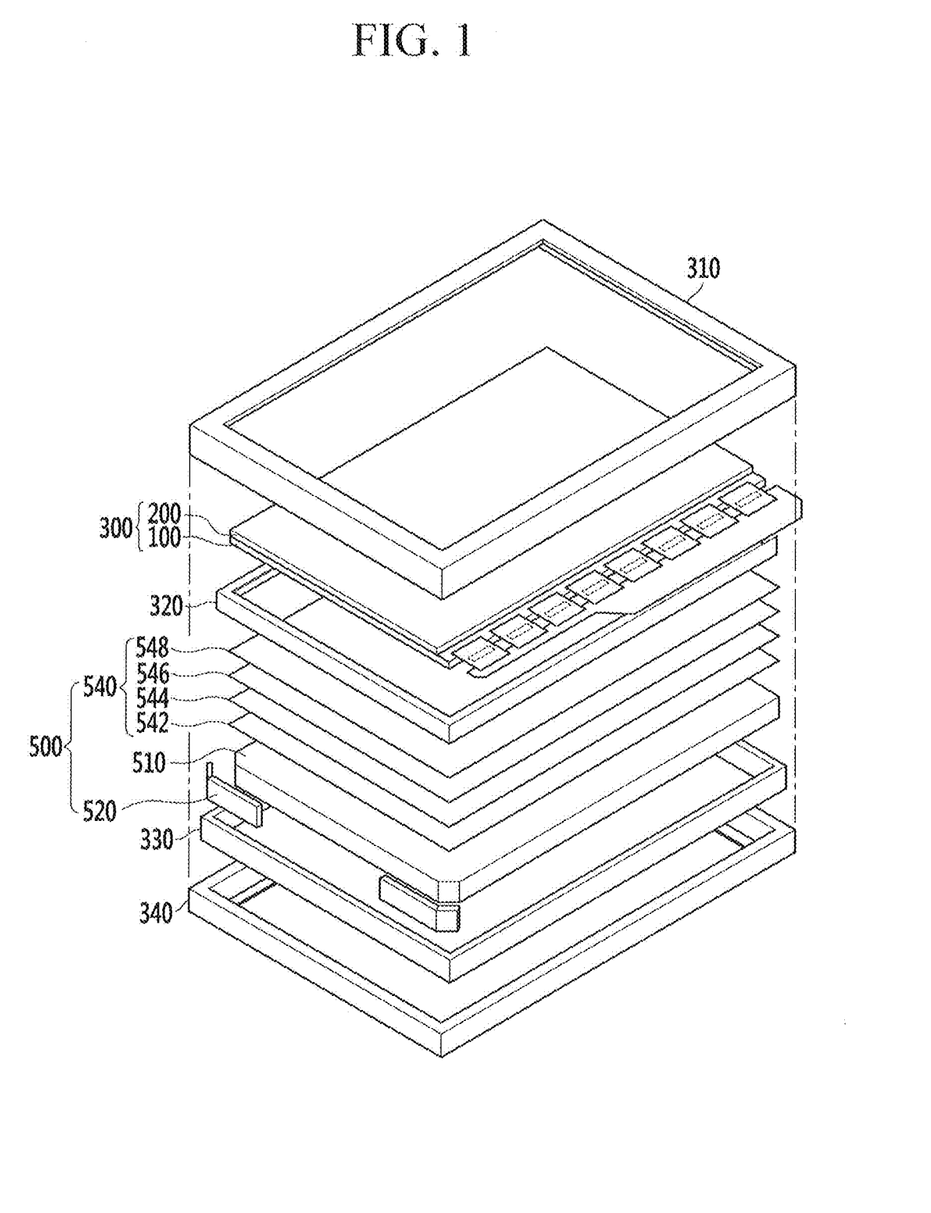
FIG. 1 is an exploded perspective view illustrating a liquid crystal display including a backlight assembly according to an exemplary embodiment of the present invention.

FIG. 1 is an exploded perspective view illustrating a liquid crystal display including a backlight assembly according to an exemplary embodiment of the present invention.

A liquid crystal display including a backlight assembly according to the exemplary embodiment of the present invention includes a backlight assembly 500 supplying light and a liquid crystal display panel 300 receiving light from the backlight assembly 500 and displaying an image, as shown in FIG. 1. In addition, a top chassis 310, an upper mold frame 320, a lower mold frame 330, and a bottom chassis 340 are connected to each other to fix the backlight assembly 500 in place.

The backlight assembly 500 includes a light source unit 520 supplying light, a light guide plate 510 receiving the light from the light source unit 520 and transmitting the light to an upper surface, and an optical sheet 540 disposed on the light guide plate 510.

The light source unit 520 includes a plurality of light emitting members generating light. The light emitting members are disposed facing a side of the light guide plate 510 and supplying the light to the side of the light guide plate 510.

The light guide plate 510 receives the light on the side from the light source unit 520 transmits the light to the upper surface. The light guide plate 510 is thickest at a portion adjacent to the light source unit 520 and gradually becomes thinner as farther away from the light source unit 320 so that light can be uniformly distributed from a point near the light source unit 520 to a point far from the light source unit 520. The upper surface of the light guide plate 510 is parallel to the liquid crystal display panel 300 and the lower surface of the light guide plate 510 is formed to have a slope with respect to the upper surface.

The optical sheet 540 increases collecting efficiency of the light emitted from the light guide plate 510 and allows the light to have entirely uniform distribution. The optical sheet 540 may be configured by a plurality of sheets and, for example, may include a first diffuser sheet 542, a first prism sheet 544, a second prism sheet 546, and a second diffuser sheet 548.

The relative locations of the light source unit 520 and the light guide plate 510, shapes thereof, and the like will be described in more detail with reference to FIGS. 2 to 7. Further, the optical sheet 540 will be described in more detail with reference to FIGS. 8 to 11.

A first substrate 100 and a second substrate 200 face each other and are bonded with each other to form the liquid crystal display panel 300 and a liquid crystal layer is formed between the first substrate 100 and the second substrate 200. Although not shown, a plurality of gate lines, a plurality of data lines, and a thin film transistor connected therewith are formed on the first substrate 100. Further, when the thin film transistor is turned on by a signal applied from the gate line, a pixel electrode receiving the signal from the data line is formed. A common electrode may be formed on the first substrate 100 or the second substrate 200 and an electric field is formed between the pixel electrode and the common electrode to control alignment of liquid crystal molecules of the liquid crystal layer. Accordingly, the light received from the backlight assembly 500 is controlled to display the image.

Hereinafter, a backlight assembly according to an exemplary embodiment of the present invention will be described.

Figure 2:
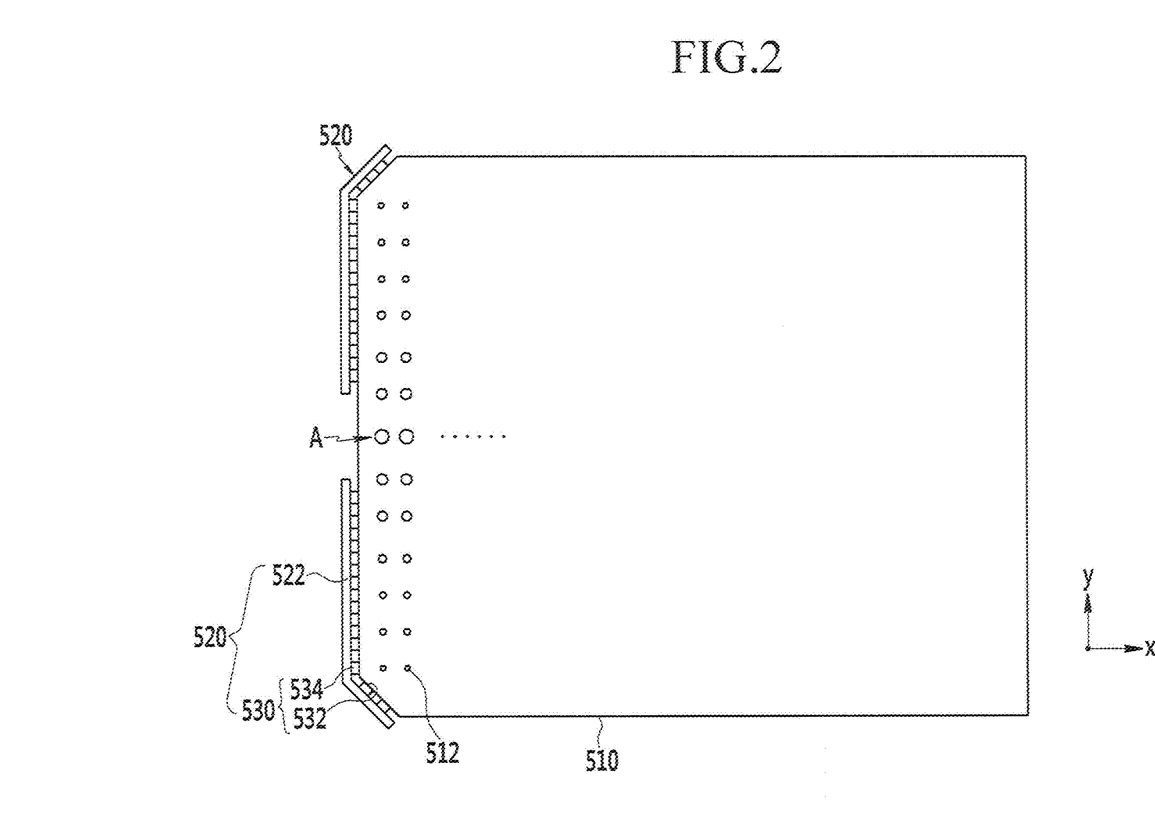
FIG. 2 is a plan view illustrating a backlight assembly according to an exemplary embodiment of the present invention.
Figure 3:
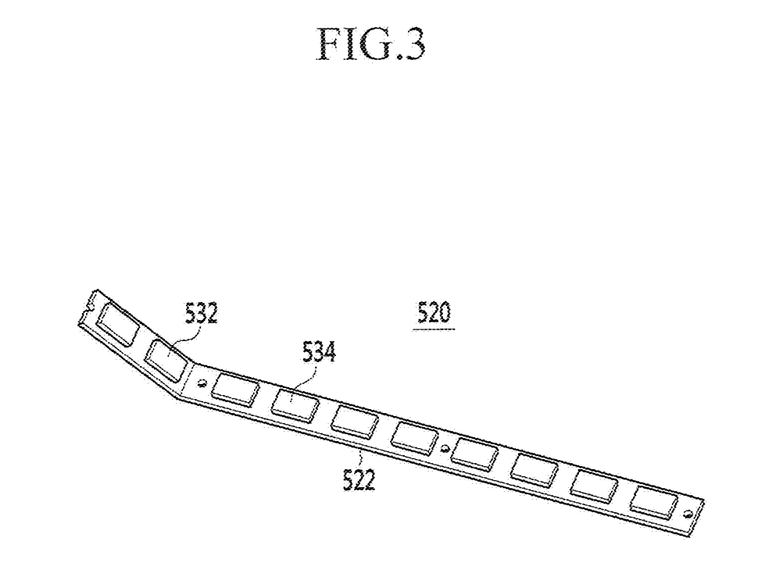
FIG. 3 is a perspective view illustrating a light source unit of a backlight assembly according to an exemplary embodiment of the present invention.

FIG. 2 is a plan view illustrating a backlight assembly according to an exemplary embodiment of the present invention and FIG. 3 is a perspective view illustrating a light source unit of a backlight assembly according to an exemplary embodiment of the present invention.

As shown in FIG. 2, a backlight assembly according to an exemplary embodiment of the present invention includes a light guide plate 510 including a cutting pan in which at least one corner is cut in an oblique direction with respect to one side and a light source unit 520 disposed facing the one side of the light guide plate 510 and the cutting part. The cutting part may be a notched corner, for example, the light guide plate 510 may be shaped substantially as a rectangle with the cutting part being a triangular corner removed from the shape that would otherwise be a rectangle. It should be understood that as used herein, where the cutting part is described as having a cut corner, this is not intended to mean that the light guide plate is necessarily cut; rather, it is intended to menu that the light guide plate has a shape that looks as though a corner has been cut off, even where the light guide plate 510 is formed to include the cutting part.

The light guide plate 510 may be formed in a rectangle and the cutting part may be formed at one corner of the four corners of the rectangle. An angle between the one side of the light guide plate 510 and the cutting part may be between 100 degrees and 150 degrees.

As shown in FIG. 2, the cutting part may be formed at two adjacent corners. For example, the cutting part is formed at two corners disposed at opposite ends of the one side. The light guide plate 510 may be formed in a rectangle including a short side and a long side and the cutting part may be formed at two corners disposed at opposite ends of the short side. Further, two cutting parts may be symmetrical to each other.

A plurality of collecting patterns 512 may be further formed at the lower surface of the light guide plate 510. The collecting patterns 512 act to increase the collecting efficiency so that more of the light is emitted to the upper surface of the light guide plate 510.

The collecting patterns 512 may be formed in a dotted shape and may have different sizes. As the sizes of the collecting patterns 512 increase, the collecting efficiency further increases. Accordingly, the size of the collecting patterns 512 is further increased at a place where the light from the light source unit 520 would otherwise have trouble reaching with sufficient intensity. The collecting patterns 512 may be formed in a direction parallel to the one side of the light guide plate 510. For example, the size of the collecting pattern 512 disposed in the column nearest to the one side of the light guide plate 510 is smallest and the size of the collecting pattern 514 increases as they become farther away from the light source unit 520. Since the point "A" has the most insufficient quantity of light, the size of the collecting pattern 512 disposed at the point A is the largest and other points are farther away from the point A, the size becomes gradually smaller, such that light may be uniformly distributed.

The light source unit 520 includes a plurality of light emitting members 532 and 534 and a printed circuit board 522 to which the light emitting members 532 and 534 are attached.

The light emitting members 532 and 534, together described as light emitting member 530, are configured by a first light emitting member 534 facing the one side of the light guide plate 510 and a second light emitting member 532 facing the cutting part of the light guide plate 510. The first light emitting member 534 and the second light emitting member 532 may include various light emitting means, for example, a light emitting diode (LED).

The first light emitting member 534 is disposed at the one side of the light guide plate 510, particularly, at the point adjacent to the cutting part. The first light emitting member 534 may be configured in plural. The first light emitting member 534, which is formed adjacent to the cutting part formed at one end of the one side of the light guide plate 510, and the first light emitting member 534, which is formed adjacent to the cutting part formed at the other end of the one side of the light guide plate 510, may be formed so that the shapes of the light emitting members and the numbers of light emitting members are symmetrical to each other. For example, as shown in FIG. 2, eight first light emitting members 534 are disposed at the upper side of a left side of the light guide plate 510 and eight first light emitting members 534 are disposed at the lower side thereof. The first light emitting member 534 is not disposed at the center of the one side of the light guide plate 510.

An emission surface of the first light emitting member 534 may be formed in contact with the one side of the light guide plate 510, such that loss of light may be reduced. The light emitted from the first light emitting member 534 is uniformly distributed from the one side of the light guide plate 510 to the other side thereof facing the one side.

The second light emitting member 532 is disposed at the cutting part of the light guide plate 510. For example, the second light emitting member 532, which is formed at the cutting part formed at one end of the one side of the light guide plate 510, and the second light emitting member 532, which is formed at the cutting part formed at the other end of the one side of the light guide plate 510, may be formed so that the shapes of the light emitting members and the numbers of the light emitting members are symmetrical to each other. For example, two second light emitting members 532 are disposed at the cutting part disposed at the upper end of a left side of the light guide plate 510 and two second light emitting members 532 are disposed at the cutting part disposed at the lower end thereof.

An emission surface of the second light emitting member 532 may be formed contact with a cutting surface of the cutting part of the light guide plate 510, such that loss of light may be reduced. When only the first light emitting member 534 exists, light does not reach the point A, but light may reach up to the point A by the second light emitting member 532.

An angle between the emission surface of the first light emitting member 534 and the emission surface of the second light emitting member 532 may be between 100 degrees and 150 degrees. The light emitted from the first light emitting member 534 and the light emitted from the second light emitting member 532 have this angle and travel through in the light guide plate 510 such that the light may uniformly reach the entire upper surface of the light guide plate 510.

As shown in FIG. 3, the light source unit 520 includes a printed circuit hoard 522 having a curved and/or angled shape with a single bend/angle. The printed circuit board 522 has a short side and a long side. A length of the short side of the printed circuit board 522 corresponds to a length of the cutting part of the light guide plate 510.

The first light emitting member 534 is disposed at the long side of the printed circuit board 522 and the second light emitting member 532 is disposed at the short side of the printed circuit board 522. The angle between the emission surface of the first light emitting member 534 and the emission surface of the second light emitting member 532 may be set by controlling a curved angle of the printed circuit board 522. Accordingly, the curved angle of the printed circuit board 522 may be between 100 degrees and 150 degrees.

A driving circuit for driving the first light emitting member 534 and the second light emitting member 532 is included in the printed circuit board 522. The driving circuit may be either on or off. The brightness of the first light emitting member 534 and the second light emitting member 532 may be controlled by the driving circuit formed in the printed circuit board 522.

Hereinafter, a ratio of a number of first light emitting members and a number of second light emitting members of a backlight assembly according to an exemplary embodiment of the present invention will be described with reference to FIGS. 4 to 7.

Figure 4:
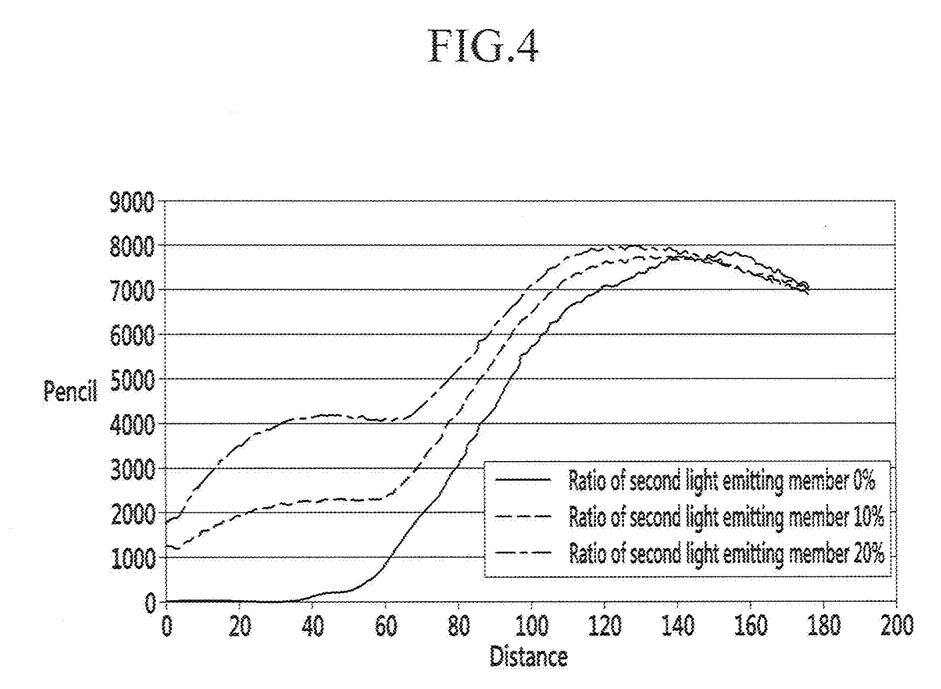
FIG. 4 is a graph illustrating a pencil beam of light as being far away from a point A of FIG. 2 increases in an X-axis direction.
Figure 5:
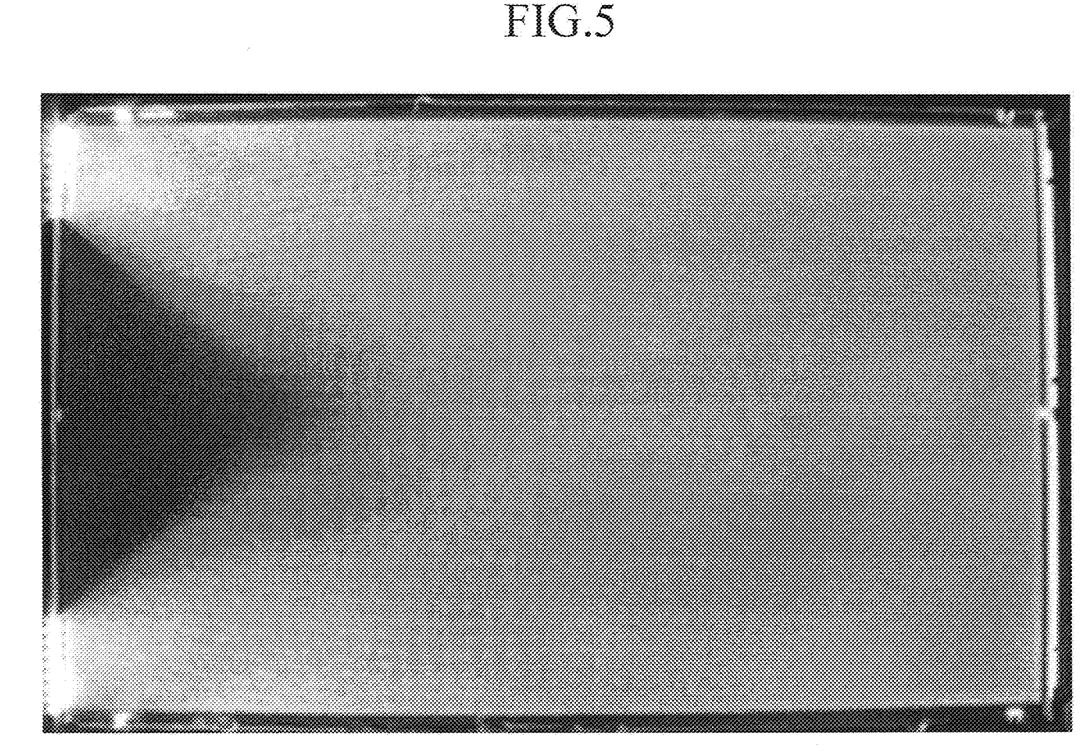
FIG. 5 is a diagram illustrating a known backlight assembly.
Figure 6:
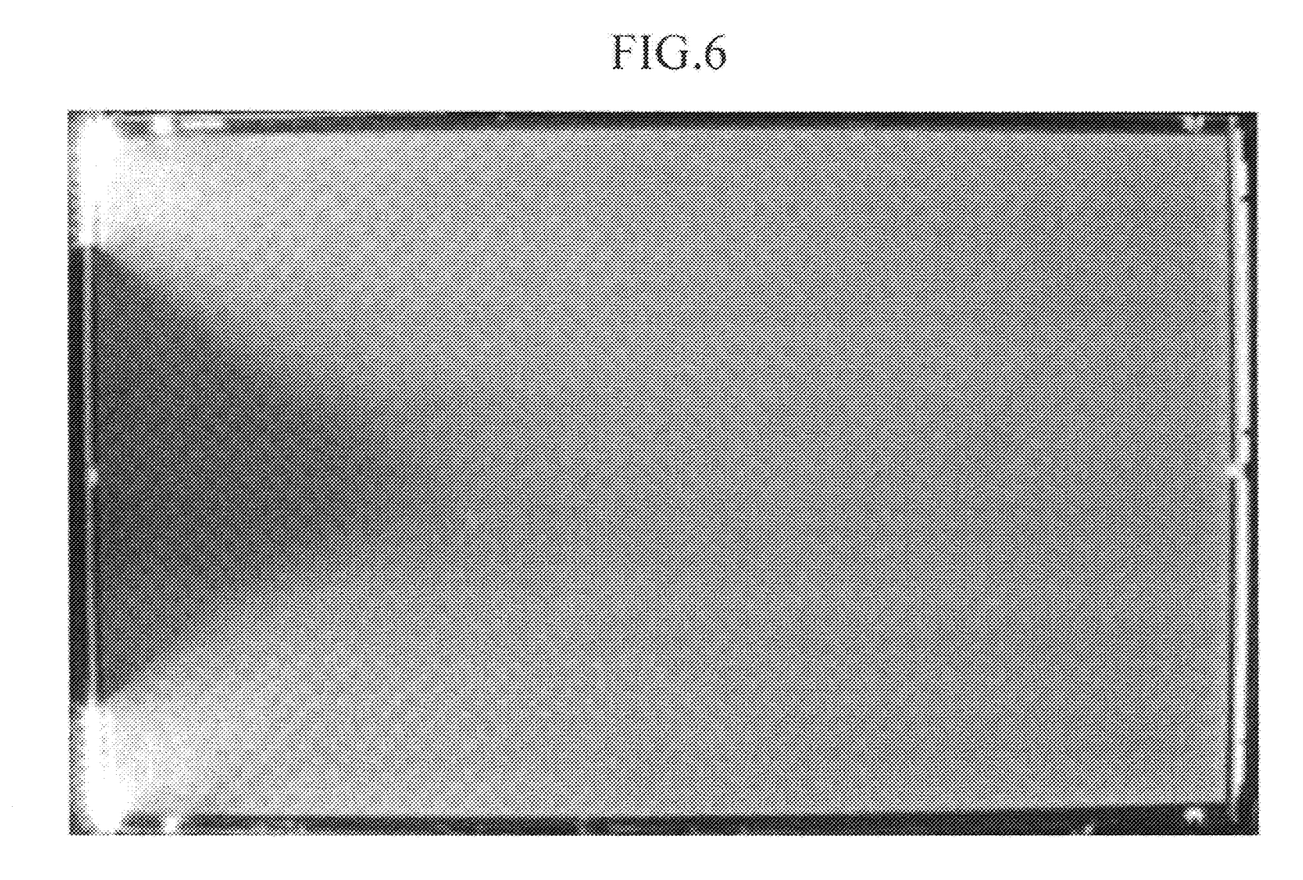
FIG. 6 is a diagram illustrating a backlight assembly according to an exemplary embodiment of the present invention.
Figure 7:
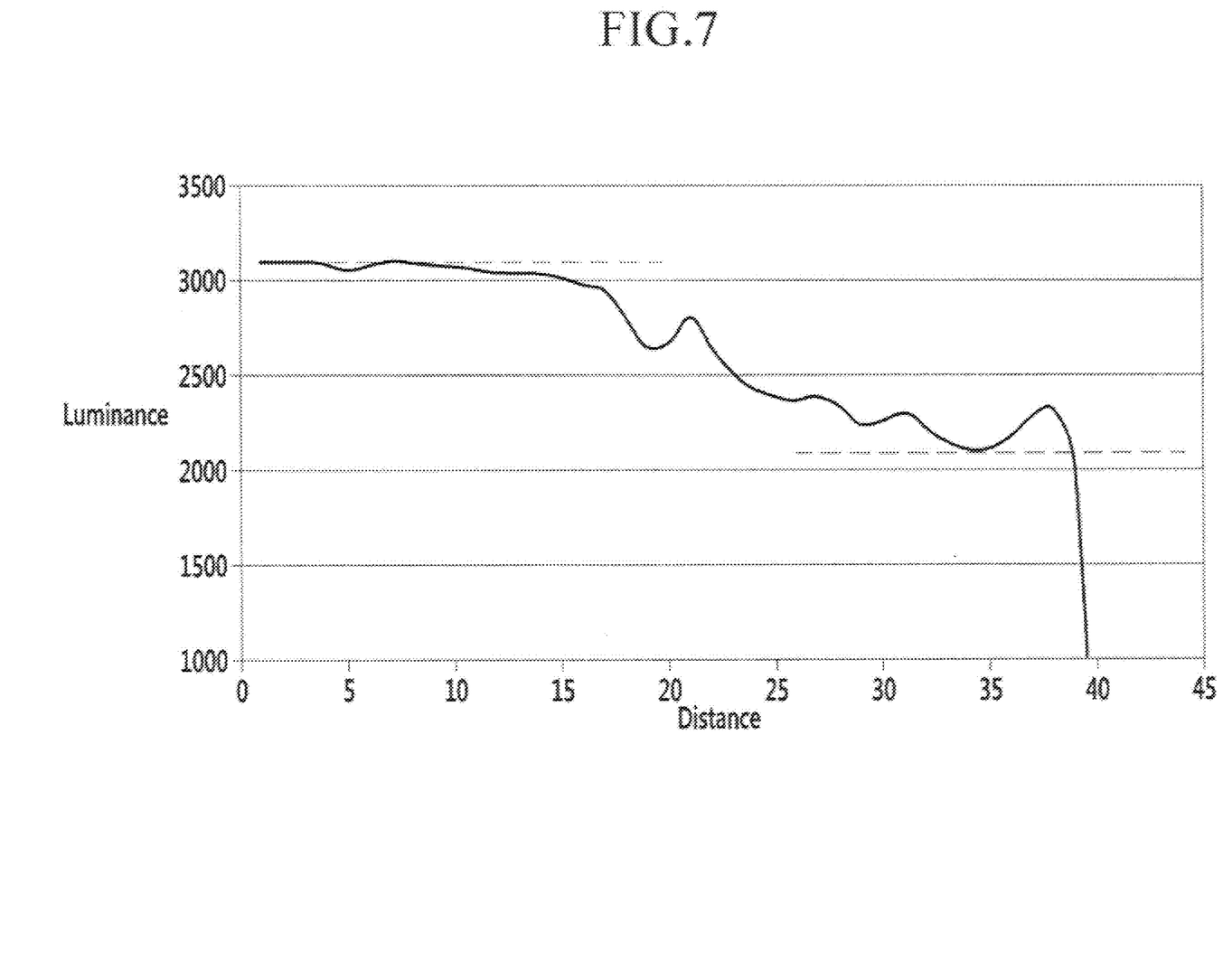
FIG. 7 is a graph illustrating luminance as being far away from a point A of FIG. 2 increases in a Y-axis direction.

FIG. 4 is a graph illustrating a pencil light beam as being far away from a point A of FIG. 2 in an X-axis direction, FIG. 5 is a diagram illustrating a known backlight assembly, FIG. 6 is a diagram illustrating a backlight assembly according to an exemplary embodiment of the present invention, and FIG. 7 is a graph illustrating luminance as being far away from a point A of FIG. 2 in a Y-axis direction.

As shown in FIG. 4, when the second light emitting member is not formed and only the first light emitting member exists, light does not reach a point spaced apart from the point A with a predetermined distance. In the exemplary embodiment of the present invention, when a ratio of the number of second light emitting members to the sum of the number of first light emitting members and the second light emitting members is 1:10, light reaches even the point A. However, a distribution difference of pencil beams of light between a point near the point A and a point far from the point A is large. For example, beams of light emitted from light source units may remain relatively narrow at locations close to the point A while beams of light emitted from light source units may spread relatively wide at locations far from the point A. In the exemplary embodiment of the present invention, when a ratio of the number of the second light emitting members to the sum of the number of the first light emitting members and the number of the second light emitting member is 1:5, light reaches even the point A and the distribution difference of pencil beams of light between a point near the point A and a point far from the point A is relatively small. For example, light can be more uniformly distributed by increasing the ratio of the number of second light emitting members to the total number of light emitting members.

Referring to FIGS. 5 and 6, a uniform degree of light distribution according to the existence of the second light emitting member can be clearly seen. FIG. 5 shows a known backlight assembly in which the second light emitting member is not formed and a portion where no light reaches the point spaced apart from the center point of the left side with a predetermined distance exists in a triangular shape. FIG. 6 shows the backlight assembly according to an exemplary embodiment of the present invention when the ratio of the number of second light emitting members to the sum of the number of first light emitting members and the second light emitting members is 1:5 and light reaches even the portion corresponding to the triangular shape where light does not reach in FIG. 5. The point near the point A is darker than the point far from the point A.

Referring to FIG. 7, luminance of the point near the point A may further increase by controlling the size of the collecting pattern formed at the lower surface of the light guide plate. For example, the collecting pattern having the largest size is formed at the point A and the collecting pattern having a smaller size is formed farther away from the point A. Accordingly, the luminance of the point near the point A may be higher than that of the point far from the point A, as shown in FIG. 7. Accordingly, light may be more uniformly distributed by properly controlling the size of the collecting pattern with respect to the distance from the point A.

Hereinafter, an optical sheet of a backlight assembly according to an exemplary embodiment of the present invention will be described with reference to FIGS. 1 and 8 to 11.

Figure 8:
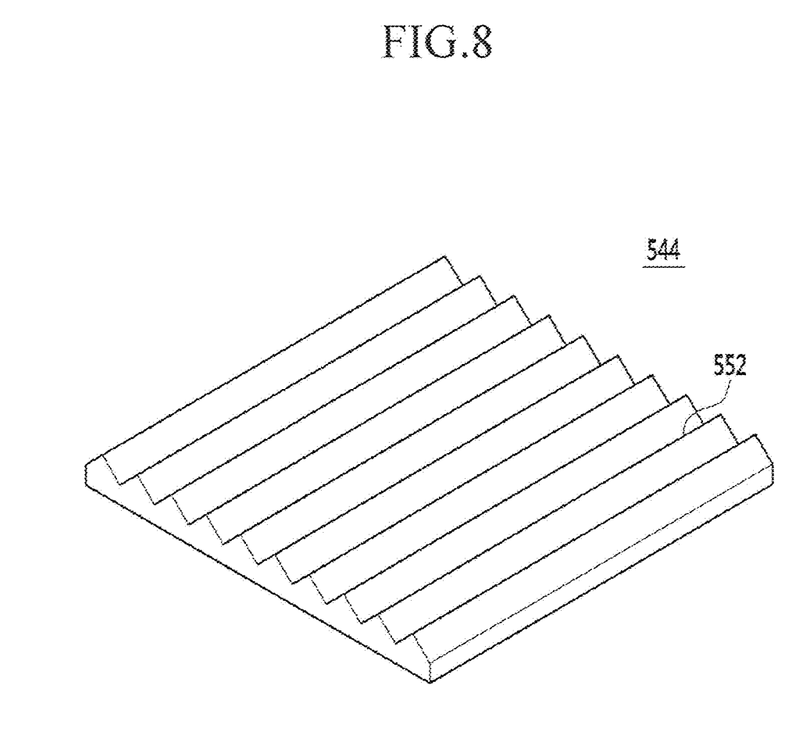
FIG. 8 is a perspective view illustrating a first prism sheet of a backlight assembly according to an exemplary embodiment of the present invention.
Figure 9:
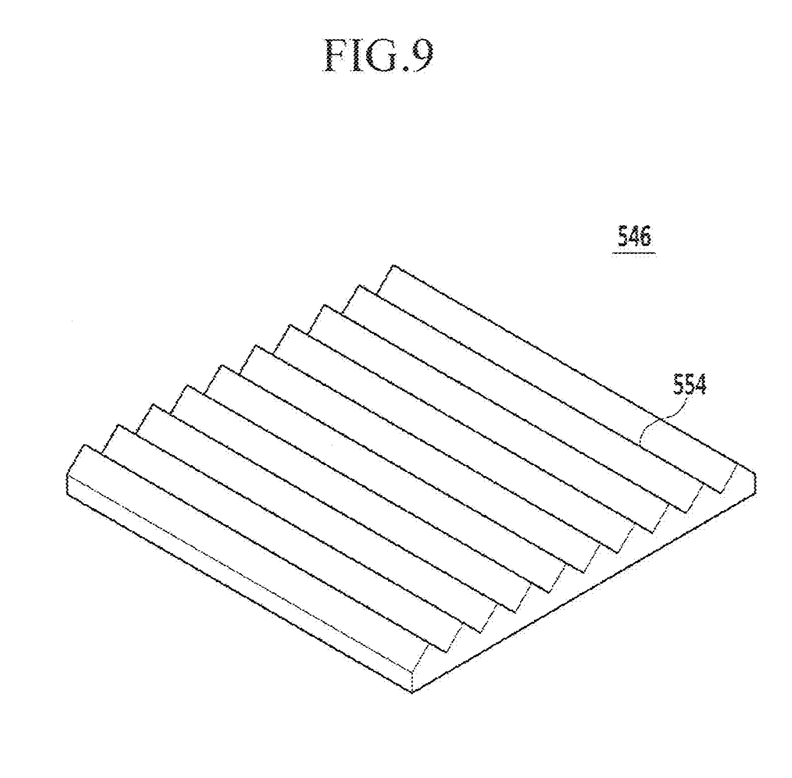
FIG. 9 is a perspective view illustrating a second prism sheet of a backlight assembly according to an exemplary embodiment of the present invention.
Figure 10:
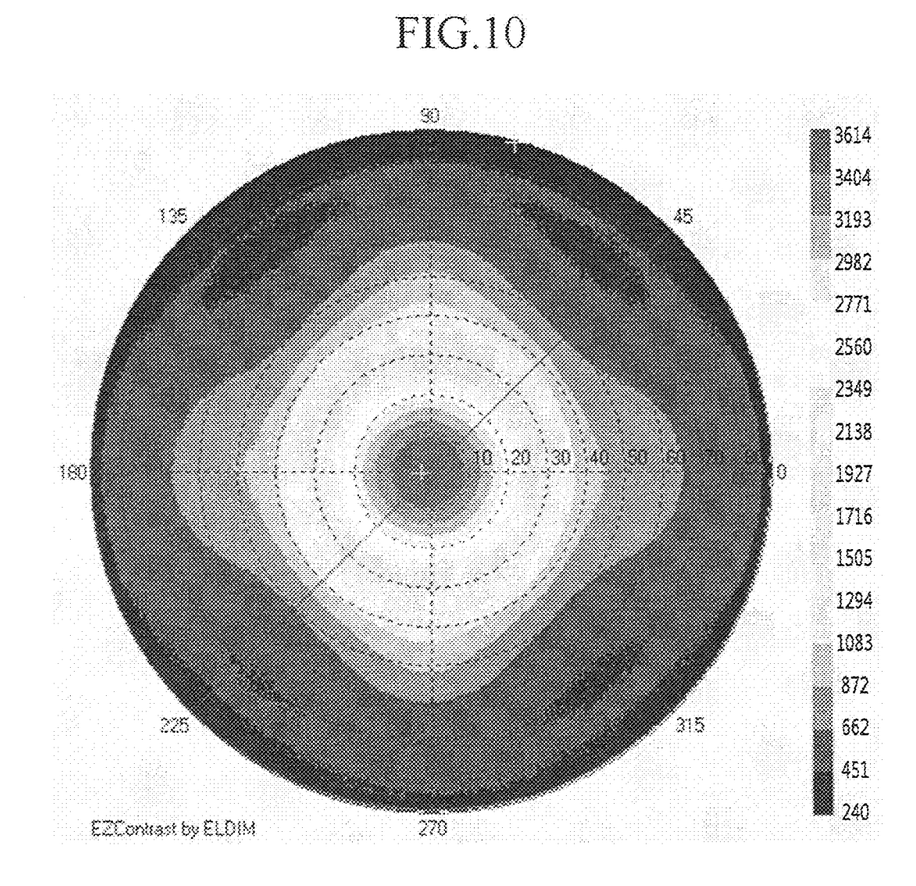
FIG. 10 is a diagram illustrating luminance distribution of a backlight assembly according to an exemplary embodiment of the present invention.
Figure 11:
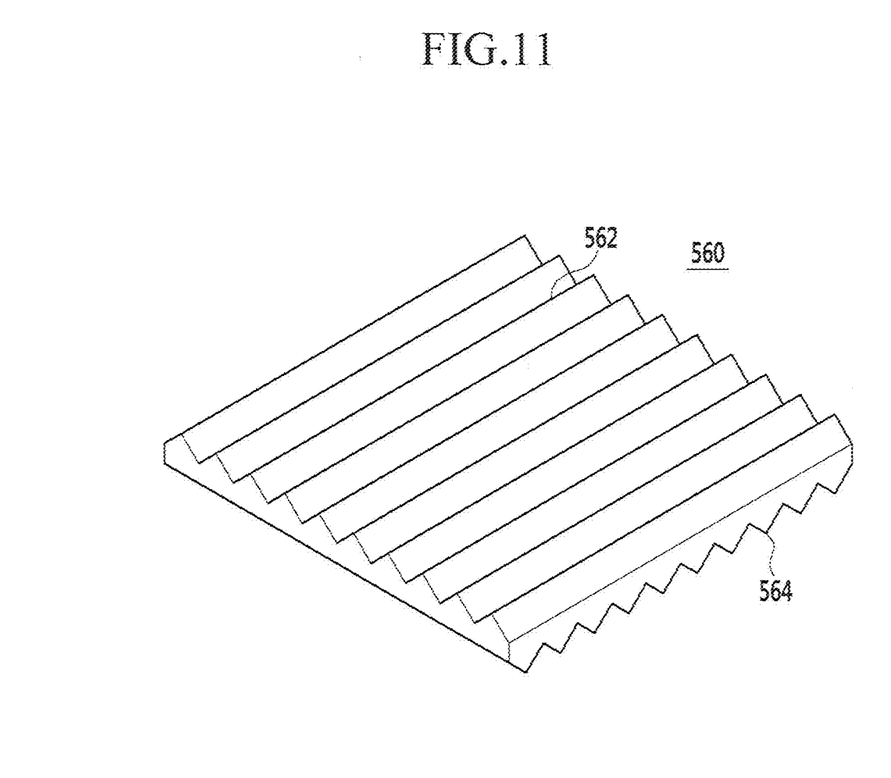
FIG. 11 is a perspective view illustrating another prism sheet of a backlight assembly according to an exemplary embodiment of the present invention.

FIG. 8 is a perspective view illustrating a first prism sheet of a backlight assembly according to an exemplary embodiment of the present invention and FIG. 9 is a perspective view illustrating a second prism sheet of a backlight assembly according to an exemplary embodiment of the present invention. FIG. 10 is a diagram illustrating luminance distribution of a backlight assembly according to an exemplary embodiment of the present invention and FIG. 11 is a perspective view illustrating another prism sheet of a backlight assembly according to an exemplary embodiment of the present invention.

As described above, an optical sheet 540 may be formed on a light guide plate 510 of a backlight assembly according to an exemplary embodiment of the present invention. A first prism sheet 544 shown in FIG. 8 and a second prism sheet 546 shown in FIG. 9 may be laminated together to form the optical sheet 540. The order in which the first prism sheet 544 and the second prism sheet 546 are laminated 546 may be changed.

Referring to FIG. 8, a plurality of first prism patterns 552 are formed on the first prism sheet 544. The first prism patterns 552 are aligned parallel with each other in a first direction.

Referring to FIG. 9, a plurality of second prism patterns 554 are formed on the second prism sheet 546. The second prism patterns 554 are aligned parallel with each other in a second direction which is perpendicular to the first direction.

When the first prism sheet 544 and the second prism sheet 546 are sequentially laminated on the light guide plate 510, the light emitted from the upper surface of the light guide plate 510 passes through the first prism pattern 552 and then the second prism pattern 554. The first and second prism patterns 552 and 554 are disposed crossing each other and light is collected from the backlight assembly in a vertical direction, such that loss of light may be minimized.

A first diffuser sheet 542 is positioned between the light guide plate 510 and the first prism sheet 544 and light emitted to the upper surface of the light guide plate 510 may be evenly diffused. Further, a second diffuser sheet 548 is positioned on the second prism sheet 546 and light emitted to the upper surface of the second prism sheet 546 may be evenly diffused.

The first diffuser sheet 542, the first prism sheet 544, the second prism sheet 546, and the second diffuser sheet 548 are sequentially laminated on the light guide plate 510 and then the light emitted from the light guide plate 510 is diffused, collected, and then, diffused again, such that uniform light distribution may be made while minimizing light loss. Referring to FIG. 10, in the backlight assembly according to the exemplary embodiment of the present invention, a front collection may be performed well.

In the backlight assembly according to an exemplary embodiment of the present invention, the optical sheet 540 may be omitted in some cases. Even in the case where the optical sheet 540 is formed, the first diffuser sheet 542 and the second diffuser sheet 548 may be omitted and only the first prism sheet 544 and the second prism sheet 546 are laminated to form the optical sheet 540. Further, according to an exemplary embodiment of the present invention, only one of the first diffuser sheet 542 and the second diffuser sheet 548 may be omitted and another sheet may be additionally formed.

In addition, instead of the first prism sheet 544 and the second prism sheet 546, another prism sheet. 560 may be formed, which is shown in FIG. 11. A plurality of first prism patterns 562 are formed at the upper surface of the prism sheet 560 shown in FIG. 11 and a plurality of second prism patterns 564 are formed at the lower surface of the prism sheet 560. The first prism patterns 562 are aligned parallel with each other in a first direction and the second prism patterns 554 are aligned parallel with each other in a second direction that is perpendicular to the first direction.

The prism sheet 560 shown in FIG. 11 works like the sheet laminating the first prism sheet 544 and the second prism sheet 546 described above with respect to FIGS. 8 and 9. Accordingly, the optical sheet 540 may be configured by only the prism sheet 560 where the first prism pattern 562 and the second prism pattern 564 are formed on the same prism sheet.

Further, a diffuser sheet may be additionally formed above and below the prism sheet 560.

While exemplary embodiments of the present invention have been described in connection with the figures, it is to be understood that the invention is not limited to the disclosed embodiments, but, on the contrary, is intended to cover various modifications and equivalent arrangements.

What is claimed is:

1. A backlight assembly, comprising:
    a light guide plate including a first side, a second side parallel to and equal in length to the first side, a third side perpendicular to the first and second sides, a fourth side parallel to and shorter in length than the third side, and at least one oblique side connecting the fourth side to the first or second side; and
    a light source unit disposed on the fourth side and the oblique side of the light guide plate,
    wherein the light guide plate further includes a plurality of collecting patterns having dotted shapes, wherein the collecting patterns formed closest to the fourth side are larger as they are farther away from the light source unit.

2. The backlight assembly of claim 1, wherein the light source unit includes:
    at least one first light emitting member disposed facing the fourth side of the light guide plate at a point adjacent to the oblique side of the light guide plate; and
    at least one second light emitting member disposed facing the oblique side of the light guide plate.

3. The backlight assembly of claim 2, wherein the at least one oblique side of the light guide plate includes a first oblique side connecting the first side of the light guide plate with the fourth side of the light guide plate and a second oblique side connecting the second side of the light guide plate with the fourth side of the light guide plate.

4. The backlight assembly of claim 3, wherein the first and second sides of the light guide plate are longer than the third side of the light guide plate.

5. The backlight assembly of claim 2, wherein the second light emitting member is at least 10% as large as the combined size of the first and second light emitting members.

6. The backlight assembly of claim 2, wherein an angle between an emission surface of the first light emitting member and an emission surface of the second light emitting member is between 100 and 150 degrees.

7. The backlight assembly of claim 1, wherein the oblique side meets the fourth side of the light guide plate at an angle of between 100 and 150 degrees.

8. The backlight assembly of claim 2, wherein the light source unit further includes a printed circuit board having attached first section and a second section that meet at an oblique angle or curve wherein the first light emitting member is attached to the first section of the printed circuit board and the second light emitting member is attached to the second section of the printed circuit board.

9. The backlight assembly of claim 8, wherein the oblique angle of the printed circuit board is between 100 and 150 degrees.

10. The backlight assembly of claim 1, further comprising:
    a first prism sheet disposed on the light guide plate; and
    a second prism sheet disposed on the first prism sheet.

11. The backlight assembly of claim 10, wherein:
    the first prism sheet includes a plurality of first prisms aligned parallel with each other and in a first direction; and
    the second prism sheet includes a plurality of second prisms aligned parallel with each other and in a second direction that is perpendicular to the first direction.

12. The backlight assembly of claim 10, further comprising a first diffuser sheet disposed between the light guide plate and the first prism sheet.

13. The backlight assembly of claim 12, further comprising a second diffuser sheet disposed on the second prism sheet.

14. The backlight assembly of claim 1, further comprising a prism sheet disposed on the light guide plate and including an upper surface and a lower surface, wherein the prism sheet includes:
    a plurality of first prisms aligned parallel with each other and in a first direction; and
    a plurality of second prisms aligned parallel with each other and in a second direction perpendicular to the first direction,
    wherein the plurality of first prisms is disposed on the upper surface of the prism sheet and the plurality of second prisms is disposed on the lower surface of the prism sheet.

15. The backlight assembly of claim 1, wherein the collecting patterns are formed larger at locations of the light guide plate that would otherwise receive inadequate levels of light.

16. A backlight assembly, comprising:
    a light guide plate including a first side, a second side parallel to and equal in length to the first side, a third side perpendicular to the first and second sides, a fourth side parallel to and shorter in length than the third side, and at least one oblique side connecting the fourth side to the first or second side; and
    a light source unit disposed on the fourth side and the oblique side of the light guide plate,
    wherein the light guide plate further includes a plurality of collecting patterns having dotted shapes of different sizes,
    wherein the collecting patterns are formed larger at locations of the light guide plate that would otherwise receive inadequate levels of light,
    wherein:
    the collecting patterns are formed in a direction parallel to the fourth side of the light guide plate; and
    the collecting patterns formed closest to the fourth side are formed larger as they are farther away from the light source unit, and
    wherein the light source unit includes:
    at least one first light emitting member disposed facing the fourth side of the light guide plate at a point adjacent to the oblique side of the light guide plate; and
    at least one second light emitting member disposed facing the oblique side of the light guide plate.

17. A backlight assembly, comprising:
    a hexagonal light guide plate including a first side, a second side that meets the first side at a right angle, a third side that meets the second side at a right angle, a fourth side that meets the third side at an oblique angle, a fifth side that meets the fourth side at an oblique angle, and a sixth side that meets the fifth and first sides at oblique angles, wherein the fourth and sixth sides are substantially shorter than the remaining sides; and
    a light source unit disposed on the fourth, fifth, and sixth sides of the light guide plat;
    wherein the light guide plate further includes a plurality of collecting patterns having dotted shapes, wherein the collecting patterns formed closest to the fifth side are larger as they are farther away from the light source unit.

18. The backlight assembly of claim 17, wherein a portion of the light source unit disposed on the fourth and sixth sides of the light guide plate account for at least 10% of the total length of the light source unit.

19. The backlight assembly of claim 17, wherein one or more prism sheets are disposed on the light guide plate and the one or more prism sheets include a first pattern of prisms aligned parallel to each other and running in a first direction and a second pattern of prisms aligned parallel to each other and running in a second direction perpendicular to the first direction.

* * * * *